UNITED STATES PATENT OFFICE.

RICHARD GLEY, OF BERLIN, GERMANY, AND PAUL DIETERLE, OF LYON, FRANCE, ASSIGNORS TO ACTIEN GESELLSCHAFT FÜR ANILIN FABRIKATION, OF BERLIN, GERMANY.

BROWN SULFUR DYE.

934,302.  Specification of Letters Patent.  Patented Sept. 14, 1909.

No Drawing.  Application filed May 24, 1909.  Serial No. 497,853.

*To all whom it may concern:*

Be it known that we, RICHARD GLEY, residing at Berlin, SW., Germany, (whose post-office address is Wilhelmstrasse 3$^b$, Berlin, SW.,) and PAUL DIETERLE, residing at Lyon, France, (whose post-office address is Montée St. Laurent, Lyon,) citizens of the German Empire, have invented certain new and useful Improvements in New Sulfurized Dyestuffs and Processes of Making Same, of which the following is a specification.

Our present invention relates to the manufacture of new sulfurized dyestuffs and is based on the following observation: If a mixture of ortho-aminophenol with meta-toluylenediamin is heated with sulfur, hydrogen-sulfid is evolved in great quantities, valuable sulfurized dyestuffs being obtained by the reaction. The tints produced with these coloring matters are, generally speaking, brown shades; the tints obtained depend, among others, to a great extent upon the proportions of the ingredients, and more especially upon those of aminophenol in relation to the meta-toluylenediamin.

The following example will serve to illustrate our invention, the parts being by weight:

Example: 55 parts of ortho-aminophenol are thoroughly mixed with 122 parts of meta-toluylenediamin and 450 parts of sulfur and the resulting mass is gradually heated to 250° C. The temperature having been maintained until the mass has become totally solid, the melt after cooling is pulverized and then introduced into about four times its weight of a concentrated aqueous solution of sodium sulfid (of 50% strength); the temperature therewhile should be at 100-120°. From the solution, after filtering when necessary, the dyestuff is precipitated by adding hydrochloric acid; it is drained, washed with water and dried. The product thus obtained produces on cotton without a mordant, from a bath containing an alkali-sulfid and a suitable salt, brown shades of a remarkable fastness. This dyestuff when pulverized forms a brown powder, insoluble in alcohol and in concentrated sulfuric acid; it easily dissolves in sodium-sulfid to a brownish-red solution. The dyestuff is very sparingly soluble in water to an orange colored solution, difficultly soluble in soda-lye to an orange colored solution and very sparingly soluble in concentrated liquor ammoniæ to a yellowish colored solution.

It is obvious to those skilled in the art that our present invention is not limited to the foregoing example or to the details given therein. We may state, for instance, that a dyestuff of a more olive-brown shade is obtained, if two molecular proportions of ortho-aminophenol and one molecular proportion of meta-toluylenediamin are heated together with sulfur, the other conditions of the foregoing example being unchanged, whereas the proportions of the ingredients in the foregoing example correspond with one molecule of ortho-aminophenol and two molecules of meta-toluylenediamin. It follows therefrom that the proportions of the ortho-aminophenol and the meta-toluylenediamin have a distinct influence upon the tints obtained according to the present invention. On the other hand everybody skilled in the art is aware, that the proportions of sulfur as well as the temperature and duration of the heating have an influence upon the shades obtained with the products resulting from sulfurizing melts.

Having now described our invention and in what manner it may be performed, what we claim as new is;—

1. As new articles of manufacture the new sulfurized dyestuffs dyeing brown shades, which may be obtained by heating a mixture of ortho-aminophenol, meta-toluylenediamin and sulfur, which new dyestuffs when pulverized form dark powders, easily soluble in an alkali-sulfid solution with a brownish-red color, very sparingly soluble in water and concentrated liquor ammoniæ and difficultly soluble in soda-lye to an orange solution, and which new coloring matters are insoluble in alcohol and concentrated sulfuric acid.

2. As a new article of manufacture the brown sulfurized dyestuff which may be obtained by heating a mixture of one molecular proportion of ortho-aminophenol and two molecular proportions of meta-toluylenediamin with sulfur, this new dyestuff when pulverized forming a brown powder, which is easily soluble in a sodium-sulfid solution to a brownish-red colored solution, very sparingly soluble in water to an orange colored solution a' ' in concentrated liquor ammoniæ to a yellowish colored solution and difficultly soluble in soda-lye to an orange colored solution, and which new coloring matter is insoluble in alcohol and concentrated sulfuric acid, this new dyestuff dyeing cotton without a mordant from a dyebath, containing an alkali-sulfid and a suitable salt, brown shades of remarkable fastness.

In testimony whereof we have hereunto set our hands in presence of two subscribing witnesses.

RICHARD GLEY.
PAUL DIETERLE.

Witnesses as to the signature of Richard Gley:
WOLDEMAR HAUPT,
HENRY HASPER.

Witnesses as to the signature of Paul Dieterle:
THOS. N. BROWN,
MARIN VACHON.